United States Patent [19]

Boller et al.

[11] 4,096,550
[45] Jun. 20, 1978

[54] ILLUMINATING ARRANGEMENT FOR A FIELD-EFFECT LIQUID-CRYSTAL DISPLAY AS WELL AS FABRICATION AND APPLICATION OF THE ILLUMINATING ARRANGEMENT

[75] Inventors: Walter Boller; Marco Donati, both of Zürich; Jürg Fingerle, Boniswil; Peter Wild, Wettingen, all of Switzerland

[73] Assignee: BBC Brown Boveri & Company Limited, Baden, Switzerland

[21] Appl. No.: 732,752

[22] Filed: Oct. 15, 1976

[30] Foreign Application Priority Data

Jun. 24, 1976 Switzerland .......................... 8067/76

[51] Int. Cl.$^2$ ................................................. F21V 7/04
[52] U.S. Cl. ........................................ 362/31; 350/96.3
[58] Field of Search ................... 240/1 EL; 350/96 R; 250/227; 340/324 R

[56] References Cited

U.S. PATENT DOCUMENTS

| 3,994,564 | 11/1976 | Somogyi | 240/1 EL X |
| 4,011,001 | 3/1977 | Moriya | 240/1 EL X |

*Primary Examiner*—Richard L. Moses
*Attorney, Agent, or Firm*—Oblon, Fisher, Spivak, McClelland & Maier

[57] ABSTRACT

An illuminating arrangement for a field-effect liquid-crystal display having a transparent plate disposed on the side of the liquid-crystal display away from the observer in which there is a recess formed in a thickened side portion thereof for receiving a light source and wherein the surface of the plate, at least on the side thereof away from the liquid-crystal display, is smooth and the surface next to the liquid-crystal display is provided with a continuous reflecting film of low transparency. Preferably, a reflector also is mounted on the surface of the plate facing away from the liquid-crystal display.

9 Claims, 4 Drawing Figures

ILLUMINATING ARRANGEMENT FOR A FIELD-EFFECT LIQUID-CRYSTAL DISPLAY AS WELL AS FABRICATION AND APPLICATION OF THE ILLUMINATING ARRANGEMENT

BACKGROUND OF THE INVENTION

1. Field of the Invention

The present invention relates to an illuminating arrangement for a field-effect liquid-crystal display with a transparent, light-distributing plate of homogeneous constitution applied to the back of the liquid-crystal display.

2. Description of the Prior Art

Field-effect liquid-crystal displays with side-illuminating arrangements for light entry parallel to the plate surfaces of the liquid-crystal cell or at the edge of the narrow side of the liquid-crystal cell are already known in various configurations and styles as, for example, in DT-OS No. 2,310,219 and in Electronic Design 14, July 5, 1974 and 16, Aug. 2, 1974. Such accessory, external light sources are indispensable for readability in the dark.

In the current commercial models, however, the luminosity is poor to unsatisfactory coupling of the light rays to the medium to be illuminated. Distribution of light intensity over the entire plate surface is also nonuniform and is generally insufficient for enabling reading in the dark.

SUMMARY OF THE INVENTION

Accordingly, it is an object of the present invention to provide an improved illuminating arrangement for a field-effect liquid-crystal display which affords the attainment of a high transmission efficiency for light energy and a uniform distribution of the light over the entire plate surface, while avoiding any annoying specular reflections.

Another object of the present invention is to provide such an improved illuminating arrangement which is designed for economical mass production on a large scale and which requires no costly fabrication procedures.

The foregoing and other problems are solved by the present invention through the provision of a plate having a thickened narrow side in which at least one light source is situated in a recess accessible from the side of the plate away from the liquid-crystal display, this side of the plate being smooth, and by providing a continuous reflecting film of low transparency on the plate surface next to the liquid-crystal display, the surface of the thickened narrow side and the end surfaces of the plate.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference numerals designate like or corresponding parts throughout the several views, and in which.

DETAILED DESCRIPTION OF THE PREFERRED EMBODIMENTS

Figure 1:
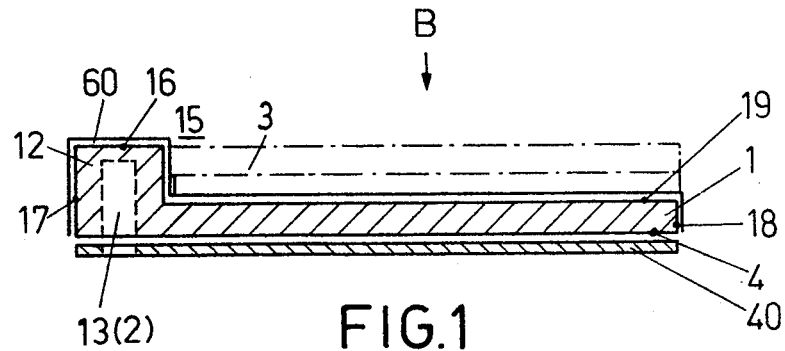
FIG. 1 shows an illuminating arrangement in cross-section with a schematically represented field-effect liquid-crystal display.

Referring now to the drawings, and more particularly to FIG. 1, a preferred illuminating arrangement according to the present invention is shown having a transparent plate 1, a light source 2 in the form of a Microlamp being inserted in a recess 13 formed in the plate 1 and a reflector 40 shown disposed below the plate 1. The plate 1 has a thickened narrow side 12 in which the light source 2 is enclosed in the recess 13, which is shown as a blind-bored recess accessible from the lower surface 4 of the plate 1, as shown, which is facing away from the liquid-crystal display 3, or that surface facing the reflector 40. The surface 4 of plate 1 which faces away from the liquid-crystal display, as already described, is smooth. The upper surface 19 of plate 1 as seen in FIG. 1, which is next to and faces the liquid-crystal display 3, along with the upper surface 16 of the thickened narrow side 12 and the end surfaces 17 and 18 of the plate 1 are provided with a continuous, reflecting film 60 of low transparency.

In this configuration of a lamp assembly, generally designated by the reference numeral 15, the light from the lamp source 2, necessary for use of the liquid-crystal display 3 at night, is reflected at the smooth surface 4 while, at the surface 19 next to the liquid-crystal display 3, it is coupled out and transmitted into the display 3, thus enabling a high-contrast and reliable readout of the displayed information. Any light exiting from the smooth surface 4 of plate 1 is turned back into plate 1 by the reflector 40 which is separated from the plate by an air gap of predetermined spacing.

The direction of viewing the display for an observer B is shown in FIG. 1, being indicated by an arrow.

The transparent plate 1 preferably is formed of polymethacrylate (Plexiglass) which acts as a light distributor. It preferably is made in one piece by a die-casting process. Also suited to this purpose, however, are transparent plates 1 of polystyrene, transparent thermoplastics or compression molded glass.

For the film 60, mixtures of transparent pigments and a likewise transparent binding agent have served satisfactorily, the pigments and binding agents having different indices of refraction. Especially suited to this purpose are pigments in flake form from glass flakes, ground mica, natural or artificial mother-of-pearl and binding agents of an acrylic or nitro-base.

Artificial mother-of-pearl is commercially available (e.g. Perl:Essenz FNC 200 from Fa. Moller & Ringstad, Sandvika, Oslo or Glanzpigment No. 14 super from Fa. Dr. Vogt & Co., Spezialfarben, Cologne, West Germany).

Any desired coloration of the film 60 can be obtained by the admixture of soluble dyes.

The thickness of the film 60 is so chosen as to give a transmission of white light in the range of a few percent, and less than 20% in any case.

Figure 2:
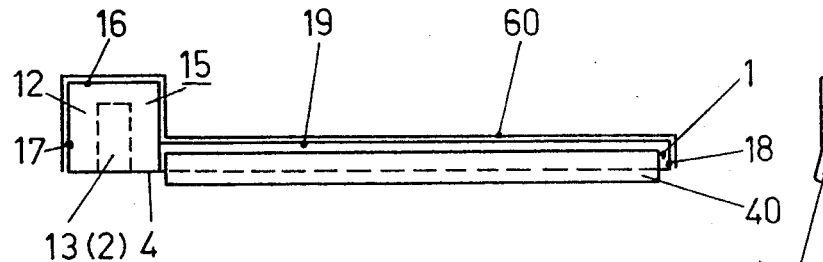
FIG. 2 shows a side view of a variant of the illuminating arrangement of FIG. 1.
Figure 3:
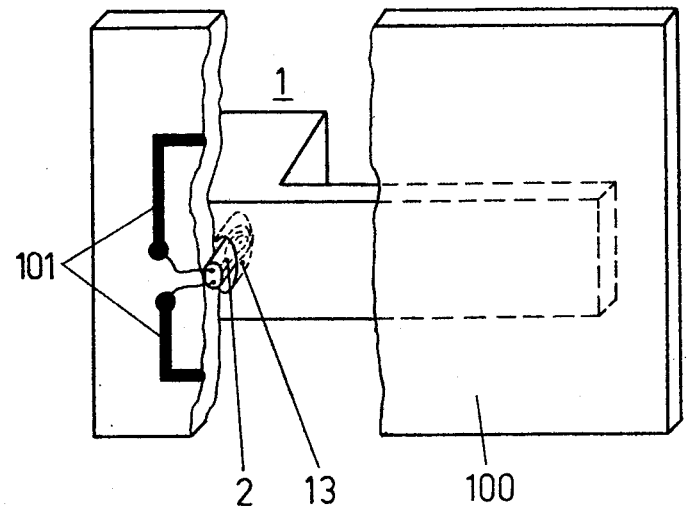
FIG. 3 shows a manner of mounting an illuminating arrangement being installed on a circuit board.

The embodiment illustrated in FIGS. 1-3 and described hereinbefore is particularly suitable for field-effect liquid-crystal displays, e.g. twisted nematic cells. Here, thicknesses of 0.4 – 1 mm have proved especially favorable for the light-distributing plates 1, the height of the lamp assembly 15 corresponding to the length of the light source 2 being used then exceeding the thickness of the plate 1. The minimum thickness of a light-distributing plate 1 of Plexiglass is 0.4 mm for satisfactory illumination of a 20 mm-long display surface.

As indicated above, the reflector 40 produces an optimal, uniform light-distribution over the entire display surface. The film 60 of the invention, however, exhibits such good reflecting properties that in daylight operation (reflection operation) there is enough of the incident light returned by this film 60 to give a high-contrast readout from the liquid-crystal display 3. Also, since the film 60 is situated directly behind the liquid-crystal display 3, annoying parallaxes are reduced to a minimum.

In night operation (transmission operation), relatively little light exits from the light-distributing plate 1 at its smooth surface 4 which, as already indicated, faces away from the liquid-crystal display 3, so that the reflector 40 is not absolutely necessary.

For achieving high efficiency, particularly important in battery-operated devices, a reflector 40 of about 50 μm thick aluminum foil has proved useful. For a compact construction, in conjunction with the control electronics of the liquid-crystal display 3, it is recommended that this aluminum foil be provided externally with an insulating plastic film. Such a film, cut to suitable dimensions, can either be clamped under the plate 1 or attached by thermal sealing, preferably under the lamp assembly 15.

Figure 2A:
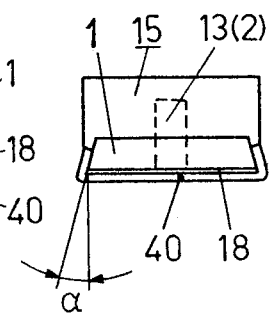
FIG. 2A shows the illuminating arrangement of FIG. 2 as seen from the front.

Another possible way of attaching the reflector 40 is that shown in the embodiment illustrated in FIGS. 2 and 2A, wherein the long edges of the light-distributing plate 1 are sloped inward at an angle α of about 20°, so that the reflector 40 can be bent over at the sides and remain fixed at a distance from the surface 4 of plate 1. It has been determined that angles of 10° – 30° permit rather secure fixation of an aluminum foil reflector 40.

Especially good reflection would be obtained with reflectors 40, as shown in FIGS. 1, 2 and 2a, which are held at a distance of approx. one tenths of a millimeter from the plate 1 to maintain a thin air film between the surface 4 of the plate 1 and the reflector 40. The reflector 40 need no special structure or matting, since unwanted specular reflection is prevented by the low transparency film 60 applied to the front of plate 1.

FIG. 3 shows a circuit board 100 with the conducting path 101 on the reverse side for connecting up a light source 2. The terminals of the light source 2 are connected to the conducting path 101 so that the illuminating device, characterized by the light-distributing plate 1 with the recess 13 therein can be laid on the circuit board 100. This makes a simplified assembly possible and offers, in particular, an arrangement amenable to repair, since the light source need not be removed in order to replace the illuminating assembly and the liquid-crystal cell.

The overall construction of the illuminating arrangement is intended for economical mass production. It should be pointed out, for example, that application of the film 60 does not require preliminary time-consuming and, particularly in the case of small objects, manually performed masking of portions not to be coated.

In practice, the light-distributing plate 1 can be laid, with its smooth surface 4 down, on an adhesive foil and the film 60 applied in a single operation to the top and side surfaces with one or more paint spray guns.

The illuminating arrangement of the invention also has the particular advantage that, by means of the smooth surface 4 provided on the other side from the liquid-crystal display, a uniform night-illumination of the liquid-crystal display is achieved over the entire display surface, and is optimized by means of the auxilary reflector 40.

A reflector obtained, for example, by directly coating the surface with reflecting dye would lead to a lessening of the difference of the index of refraction between the material and the air, so that, in the vicinity of the illuminating element significantly more light would be coupled out than at the opposite end.

Moreover, an illuminating arrangement conforming to the invention enables reduction of the space requirement for a field-effect liquid-crystal display suitable for day and night operation. This is of special significance in the incorporation of these displays in portable electronic devices, particularly in wrist watches and the like.

Obviously, many modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. An illuminating arrangement for a field-effect-liquid-crystal display comprising:
   a transparent plate of homogeneous constitution, which acts as a light distributor, being disposed on the reverse side of the liquid-crystal display, said plate having a thickened portion at one side thereof in which a recess is formed, said recess being accessible from the surface of said plate on the side away from the liquid-crystal display, and said surface of said plate on the side away from the said liquid-crystal display being smooth;
   a light source disposed in said recess of said thickened portion of said plate; and
   a continuous reflecting film of low transparency and not a roughened surface surface comprising mixtures of transparent pigments and transparent binding agents having different indices of refraction being provided on the surface of said plate next to said liquid-crystal-display, on the surface of said thickened portion thereof and on the end surfaces of said plate to function as a background for daylight operation, the film having a thickness yielding a transmission of white light less than 20% to return sufficient incident light in daylight operation to produce a high contrast readout from the liquid-crystal display.

2. An illuminating arrangement as set forth in claim 1, further comprising a reflector mounted on said surface of said plate on the side away from the liquid-crystal display.

3. An illuminating arrangement as set forth in claim 2, wherein said reflector is an aluminum foil located at a small distance from said surface of said plate on the side away from said liquid-crystal display.

4. An illuminating arrangement as set forth in claim 1, wherein said light-distributing plate is a die-cast part of one of the group consisting of polymethacrylate, polystyrene and transparent thermoplastic.

5. An illuminating arrangement as set forth in claim 1, wherein:

said transparent pigment of said film is in flake form and consists of the group including flaked glass, mother-of-pearl and pulverized mica; and said binding agent is one of an acrylic or a nitro base clear lacquer.

6. An illuminating arrangement as set forth in claim 2, wherein the long edges of said light-distributing plate are sloped inward at an angle of 10°–30°, and said reflector is held onto said light-distributing plate by said bent-in edges of said reflector.

7. An illuminating arrangement as set forth in claim 1, wherein said light-distributing plate consists of polymethacrylate and, at least partially, has a thickness of 0.4–1.0 mm.

8. An illuminating arrangement as set forth in claim 2, characterized by the fact that the entire surface of said plate is smooth.

9. An illuminating arrangement as set forth in claim 8, wherein said light source is firmly attached to a circuit board acting as a supportive backing for said liquid-crystal display.

* * * * *